US009390087B1

(12) United States Patent
Roux et al.

(10) Patent No.: US 9,390,087 B1
(45) Date of Patent: Jul. 12, 2016

(54) SYSTEM AND METHOD FOR RESPONSE GENERATION USING LINGUISTIC INFORMATION

(71) Applicant: Xerox Corporation, Norwalk, CT (US)

(72) Inventors: Claude Roux, Grenoble (FR); Christophe Servan, Crolles (FR)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/617,305

(22) Filed: Feb. 9, 2015

(51) Int. Cl.
    *G06F 17/27*     (2006.01)
    *G06F 17/28*     (2006.01)

(52) U.S. Cl.
    CPC ........ *G06F 17/2881* (2013.01); *G06F 17/2705* (2013.01); *G06F 17/2785* (2013.01); *G06F 17/274* (2013.01)

(58) Field of Classification Search
    USPC ................ 704/9, 10, 231, 251, 257, 270, 277
    See application file for complete search history.

(56) References Cited

U.S. PATENT DOCUMENTS

| 7,058,567 | B2 | 6/2006 | Aït-Mokhtar et al. |
|---|---|---|---|
| 2005/0138556 | A1 | 6/2005 | Brun et al. |
| 2007/0192085 | A1 | 8/2007 | Roulland et al. |
| 2008/0091408 | A1 | 4/2008 | Roulland et al. |
| 2008/0294423 | A1 | 11/2008 | Castellani et al. |
| 2009/0106224 | A1 | 4/2009 | Roulland et al. |
| 2009/0292700 | A1 | 11/2009 | Castellani et al. |
| 2011/0123967 | A1 | 5/2011 | Perronnin et al. |
| 2012/0150920 | A1 | 6/2012 | Roulland et al. |
| 2014/0288920 | A1 | 9/2014 | Proux |

OTHER PUBLICATIONS

Aït-Mokhtar, et al., "Robustness beyond Shallowness: Incremental Dependency Parsing," Special Issue of NLE Journal, pp. 1-24 (2002).
Aït-Mokhtar, et al., "Subject and Object Dependency Extraction Using Finite-State Transducers," Proc. 35th Conf. of the Association for Computational Linguistics (*ACL'97*) Workshop on Information Extraction and the Building of Lexical Semantic Resources for NLP Applications, pp. 71-77 (1997).
Aït-Mokhtar "Incremental Finite-State Parsing," Proc. 5th Conf. on Applied Natural Language Processing (*ANLP'97*), pp. 72-79 (1997).
Bateman, "Enabling technology for multilingual natural language generation: the KPLM development environment," Natural Language Engineering, 3(1):pp. 15-55 (1997).

(Continued)

*Primary Examiner* — Vu B Hang
(74) *Attorney, Agent, or Firm* — Fay Sharpe LLP (57) ABSTRACT

A method for generating a natural language response to a customer inquiry includes parsing sentences in a corpus of natural language dialogs between a respective customer and an agent to extract dependencies. Each parsed sentence is represented by a dependency graph, based on the extracted dependencies. Dependency templates are generated, at least some of which are each generated from two or more of the extracted dependency graphs (e.g., using variables which each represent a group of words referring to a same topic) and are stored in a knowledge base. In response to the customer inquiry, one of the stored dependency templates is identified and a natural language response to the inquiry is generated, using the identified dependency template. The natural language response is generated based on words extracted from the natural language dialogs that are linked, in memory, to the identified dependency template.

20 Claims, 5 Drawing Sheets

(56) References Cited

OTHER PUBLICATIONS

Bell, "Language style as audience design," Language in society, 13(02): pp. 145-204 (1984).

Brun, et al., "Document structure and multilingual authoring," Proc. 1st Int'l Conf. on Natural language generation, vol. 14, pp. 24-31 (2000).

Charton, "Génération de phrases multilingues par apprentissage automatique de modèles de phrases," PhD thesis, Université d'Avignon, 2011 (Abstract Only).

Clark, et al., "Audience design in meaning and reference," Adv. in Psychol., 9: pp. 287-299 (1982).

Isabelle, et al., "Critter: a translation system for agricultural market reports," Proc. 12th Conf. on Computational Linguistics, vol. 1, pp. 261-266 (1988).

Janarthanam, et al., "Adaptive referring expression generation in spoken dialogue systems: Evaluation with real users," Proc. 11th Annual Meeting of the Special Interest Group on Discourse and Dialogue, pp. 124-131 (2010).

Knott, et al., "A dialogue-based knowledge authoring system for text generation," AAAI Spring Symposium on Natural Language Generation in Spoken and Written Dialogue, pp. 71-78 (2003).

Lavoie, et al., "A fast and portable realizer for text generation systems," Proc. 5th Conf. on Applied Natural Language Processing, pp. 265-268 (1997).

Mel'Čuk, et al., "Towards a functioning 'meaning-text' model of language," Linguistics, 8(57):10-47, 1970.

Power, et al., "Multilingual authoring using feedback texts," Proc. 17th Int'l Conf. on Computational Linguistics, vol. 2, pp. 1053-1059 (1998).

Reiter, "Has a consensus NL generation architecture appeared, and is it psycholinguistically plausible?" Proc. 7th Int'l Workshop on Natural Language Generation, pp. 163-170 (1994).

SYSTEM AND METHOD FOR RESPONSE GENERATION USING LINGUISTIC INFORMATION

BACKGROUND

The exemplary embodiment relates to natural language processing and finds particular application in connection with a system and method for response generation in a dialogue between a customer and a customer service agent.

Dialogue systems are often employed in customer services. In many situations, a call center agent acts as an interface between the customer and a knowledge base. However, employing humans to serve as customer service agents can be expensive. In addition, creating, maintaining, and accessing knowledge bases is expensive and time-consuming. For example, there may be a large repository of dialogue data in customer call centers relating to customer sentiment, described symptoms, problem types, root causes and the techniques agents use to resolve customer problems. Furthermore, these repositories usually share some common characteristics when linguistic information is extracted from the dialogues. The lexicons, both words and phrases, and the syntactic structure are very similar from one dialogue to another, often with very little variation. All of this data belong to a limited, pre-defined set of expressions, which can all be processed in advance, stored, and accessed by a dialogue system to generate text.

Dialogue systems usually include three parts: a Natural Language Understanding (NLU) module, a Dialogue Manager (DM) module, and a Natural Language Generation (NLG) module. In most implementations, the NLU and NLG modules are not related nor are they connected. They are completely independent and can be replaced by any other available NLU or NLG modules.

The NLG module contains different parts in order to generate sentences. These may include a content planner, which links the intention of communication (i.e., instructions given by the Dialogue Manager module) and the semantic representation, a sentence planner, which links the semantic and the syntactic representations, and a surface generator, which lexicalizes the syntactic representation with words and aggregates them. Finally, a structure realizer applies the right morphology to the words, according to the syntactic representation.

Most approaches to NLG are based on word templates with specific slots for variable words in order to generate sentences. These gaps are usually replaced with keywords or named entities, such as device names, city names, etc. In order to extract these templates, a set of sentences is processed with a NLU module, to identify the necessary entities on which these word templates will be based. In this approach, all the parts of a NLG module are put together. This approach can be implemented with Finite States Machines, but it lacks flexibility and does not allow variations or paraphrases in NLG.

Other approaches feature systems which usually require specific grammars, based on context-free rules or on dependencies, to generate new sentences. These include KPML, disclosed in Bateman, "Enabling technology for multilingual natural language generation: the KPML development environment," *Natural Language Eng.*, 3(1):15-55, 1997, and RealPro, disclosed in Lavoie, et al., "A fast and portable realizer for text generation systems," in *Proc. 5th Conf. on Applied Natural Language Processing*, pp. 265-268, 1997. However, despite slight differences in implementation between these systems (e.g., KPML is based on context-free grammars, while RealPro is based on dependencies), they all share the same input issue. Specifically, translation from original data to NLG text is done through a complex semantic representation that restricts the use of these systems to trained users. Others have tried to propose a solution to solve this issue.

For instance, Knott and Wright in "A dialogue-based knowledge authoring system for text generation," *AAAI Spring Symposium on Natural Language Generation in Spoken and Written Dialogue*, pp. 71-78, 2003, have proposed a way to enrich the knowledge base of generation systems with simple sentences which are then analyzed on the fly and whose content is used to enrich the knowledge base. In other words, planner rules are constructed from the analysis of simple sentences. However, this knowledge base does not contain actual sentences, but information that is extracted from the sentences.

Power and Scott, in "Multilingual authoring using feedback texts," *Proc. 17th Int'l Conf. on Computational Linguistics*, Vol. 2, pp. 1053-1059, 1998, propose a similar approach. However, the knowledge base is used as a guide to the construction of a semantic representation of the original data, not as way to directly guide the process of NLG.

U.S. Pub. No. 20050138556 to Brun et al., incorporated herein by reference in its entirety, describes another system of generation in which a syntactic parser is involved. This system takes as input short descriptions in a specific domain from which semantico-syntactic templates are extracted. The goal of this system is then to generate an automatic summary by merging these different descriptions. The generation is done using MDA (Multilingual Document Authoring), which uses the extracted templates to provide the summary in many different languages. See, Brun et al., "Document structure and multilingual authoring," Proc. 1st Int'l Conf. on Natural language Generation, Vol. 14, pp. 24-31, 2000.

There remains a need for a natural language generation system which is flexible, having a knowledge base built from natural language input which is also directly used to generate text. The exemplary systems and methods disclosed herein can meet this need through the analysis of short sentences, which already convey rich linguistic information, and through the use of small pieces of generation grammar to produce complex sentences in a given natural language.

INCORPORATION BY REFERENCE

The following references, the disclosures of which are incorporated herein by reference in their entireties, are mentioned:

U.S. Pub. No. 20080294423, published Nov. 27, 2008, entitled INFORMING TROUBLESHOOTING SESSIONS WITH DEVICE DATA, by Castellani, et al., discloses a system and method for troubleshooting a problem with a device which includes acquiring device data for the device, receiving a user's query concerning a device in a natural language, presenting possible refinements to at least a portion of the user's query for defining a problem statement, and presenting candidate solutions that are associated with the defined problem statement in a knowledge base informed by the device data.

U.S. Pub. No. 20090106224, published Apr. 23, 2009, entitled REAL-TIME QUERY SUGGESTION IN A TROUBLE SHOOTING CONTEXT, by Roulland, et al., discloses a method for assisting a user to develop a query in a natural language by presenting a subset of ranked query suggestions from a collection of ranked query suggestions to the user as candidates for user queries.

U.S. Pub. No. 20090292700, published Nov. 26, 2009, entitled SYSTEM AND METHOD FOR SEMI-AUTOMATIC CREATION AND MAINTENANCE OF QUERY EXPANSION RULES, by Castellani, et al., discloses a system and method that enable semi-automated generation of query expansion rules for searching a knowledge base.

U.S. Pub. No. 20110123967, published May 26, 2011, entitled DIALOG SYSTEM FOR COMPREHENSION EVALUATION, by Perronnin, et al., discloses a system and method including receiving an input text and natural language processing the text to identify dependencies between text elements in the input text. Grammar rules are applied to generate questions and associated answers from the processed text, at least some of the questions being based on the identified dependencies. A set of the generated questions is posed to a reader of the input text and the comprehension of the reader evaluated, based on the reader's responses to the questions posed.

U.S. Pub. No. 20120150920, published Jun. 14, 2012, entitled METHOD AND SYSTEM FOR LINKING TEXTUAL CONCEPTS AND PHYSICAL CONCEPTS, by Roulland, et al., discloses a method including extracting candidate noun phrases from a knowledge base for a device and generating a set of candidate concepts based on the extracted noun phrases. A user selects a physical component shown in a graphical representation of the device and a candidate concept which is to be linked to that component. The knowledge base is then indexed based on the mapped concepts.

U.S. Pub. No. 20140288920, published Sep. 25, 2014, entitled ASSISTED UPDATE OF KNOWLEDGE BASE FOR PROBLEM SOLVING, by Proux, discloses a system and method for proposing candidate solutions for updating a knowledge base. Knowledge base solutions in a natural language are each processed to generate a first action sequence including a verb and an object including a noun which is in a syntactic dependency with the respective verb. A recorded solution is received and processed to generate a second action sequence. The second and first action sequences are compared to determine whether the recorded solution corresponds to one of the knowledge base solutions. Based on the comparison, an update to the knowledge base is proposed.

BRIEF DESCRIPTION

In accordance with one aspect of the exemplary embodiment, a method for generating a natural language response includes parsing sentences in a corpus of natural language dialogues to extract dependencies, each parsed sentence being represented by a dependency graph. Dependency templates are generated from the extracted dependency graphs. The dependency templates are stored in a knowledge base. In response to an inquiry, one of the dependency templates in the knowledge base is identified. A natural language response to the inquiry is generated using the identified dependency template, the natural language response being generated based on words extracted from the natural language dialogues that are linked to the dependency template.

At least one of the parsing sentences, generating dependency templates, and generating a natural language response may be performed with a processor.

In accordance with another aspect of the exemplary embodiment, a system for generating a natural language text includes memory which stores instructions for processing sentences in a natural language dialogue to extract dependencies within the sentences, each of the processed sentences being represented by a dependency graph, generating dependency templates from the extracted dependency graphs, and storing the dependency templates in a knowledge base. At least one dependency template is extracted from the knowledge base in response to an inquiry. A sentence is generated in the natural language based on the extracted dependency template. A processor in communication with the memory executes the instructions.

In accordance with one aspect of the exemplary embodiment, a method for answering an inquiry includes providing access to a knowledge base stored in memory. A set of dependency templates is stored in the knowledge base, the dependency templates having been built from a corpus of natural language dialogues, each of the dialogues corresponding to communications between a respective customer and an agent related to a problem experienced with a device by the customer, each dependency template representing a plurality of sentences extracted from the corpus. A natural language inquiry is received from a customer related to a problem experienced with the device. The natural language inquiry is parsed to extract a set of dependencies. The extracted set of dependencies is compared with the dependency templates stored in the knowledge base. Based on the comparison, one of the dependency templates is identified. A natural language response to the inquiry is generated, based on the identified dependency template.

At least one of the parsing the natural language inquiry comparing the extracted set of dependencies, identifying one of the dependency template, and generating the natural language response may be performed with a processor.

In accordance with one aspect of the exemplary embodiment, a natural language generation system includes memory which stores a set of dependency templates in a knowledge base, the dependency templates having been derived from sets of dependencies extracted from parsed natural language dialogues, each of the dependency templates corresponding to a solution in the natural language dialogue provided in response to a problem with a device. A natural language understanding component parses a natural language inquiry relating to the device. A dialogue manager compares the parsed natural language inquiry with the natural language dialogues to find a matching problem in the natural language dialogues. A natural language generation component identifies one of the dependency templates which is associated with one of the solutions in the natural language dialogue, based on the comparison made by the dialogue manager, and which uses the identified dependency template to generate a natural language response to the natural language inquiry. A processor implements the natural language understanding component, the dialogue manager, and the natural language generation component.

DETAILED DESCRIPTION

A system and method are provided to facilitate customer care through the use of natural language understanding and natural language response generation. The exemplary system uses a natural language understanding (NLU) component to identify the customer's needs. The NLU component automatically extracts and understands the information in a customer's question. The NLU component then passes the detected information to a dialogue manager (DM). The DM processes and sends the data to a natural language generation (NLG) component. The NLG component then builds an answer, which can be linguistically understood by the customer.

The exemplary system facilitates building a knowledge base with natural language input which is directly used to generate the text. The exemplary system and method are configured for extracting customer text strings (e.g., sentences) constituting an inquiry and generating a response including one or more responsive text strings (e.g., sentences) in the same natural language as the inquiry, to propose to an agent for responding to the customer or, in an automated system, to output automatically.

The exemplary method for generating sentences in the context of dialogue systems includes first collecting set of sentences, reflecting occurrences in real dialogues. Then, the sentences are parsed and syntactic dependencies are extracted. From the set of dependencies, a template is generated, which is used in order to generate new sentences. In order to generate this template, some pieces of information are replaced (mostly lexical ones) with variables. At the sentence generation step, lexical information is provided and instantiated with information provided by the template (verb tenses, word properties, etc.) so that the surface forms are generated. The use of the same syntactic formalism through the whole system makes the design of the transformation rules simple (or at least simpler than using different formalisms).

Figure 1:
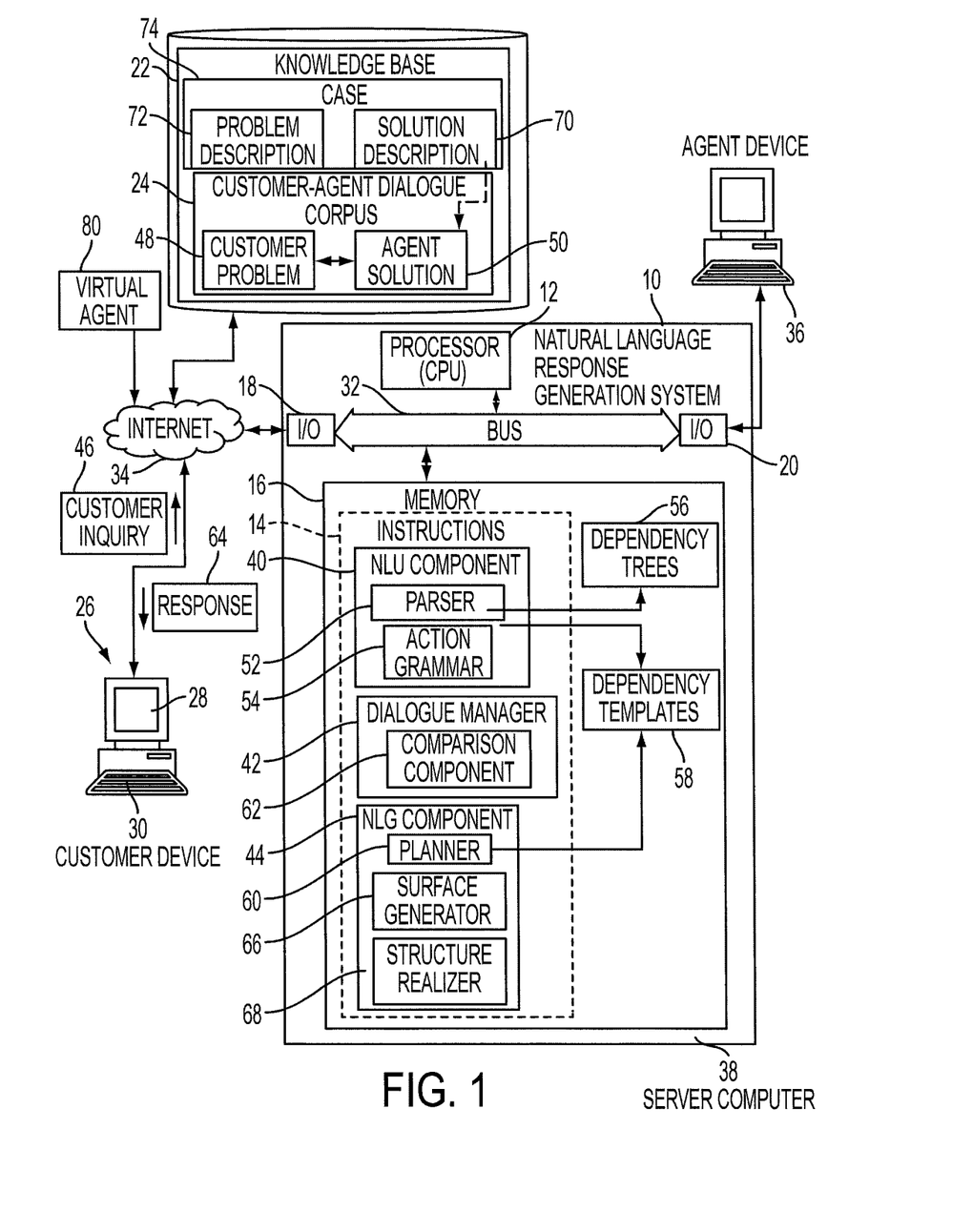
FIG. 1 is a functional block diagram illustrating one embodiment of the natural language generation system.

With reference to FIG. 1, an environment in which an exemplary natural language response generation system 10 operates is illustrated. The response generation system 10 includes a processor 12, which controls the overall operation of the computer-implemented system by execution of processing instructions 14 which are stored in memory 16 connected to the processor. Computer system 10 also includes a network interface 18 and a user input output (I/O) interface 20. The network interface 18 may be communicatively connected with a call center and/or knowledge base 22 and may receive as input a training corpus 24 of customer-agent dialogues which include text or recordings generated by the call center. The I/O interface 18 may also communicate with a customer device 26, e.g., operated by customer. The customer device 26 may include one or one or more of a display 28, for displaying information to users and a user input device 30, such as a keyboard or touch or writable screen, and/or a cursor control device, such as mouse, trackball, or the like, for inputting text. The various components of the system 10 may be all connected by a bus 32. Connections with the knowledge base 22 may be made via wired or wireless links 34, such as a local area network or a wide area network, such as the Internet. In one embodiment, interface 20 may communicate with an agent device 36, similarly configured to the customer device. Connections with the customer device 26 and agent device 36 may be made via similar wired or wireless links 34, such as a local area network or a wide area network, such as the Internet.

The system 10 may be hosted by any suitable computing device or devices 38, e.g., a PC, such as a desktop, a laptop, palmtop computer, portable digital assistant (PDA), server computer, cellular telephone, smart phone, tablet computer, pager, combination thereof, or other computing device capable of executing instructions for performing the exemplary method. The knowledge base 22 and corpus 24 may be stored in memory 16 or in remote memory.

The memory 16 may represent any type of non-transitory computer readable medium such as random access memory (RAM), read only memory (ROM), magnetic disk or tape, optical disk, flash memory, or holographic memory. In one embodiment, memory 16 comprises a combination of random access memory and read only memory. In some embodiments, the processor 12 and memory 16 may be combined in a single chip. The network interfaces 18, 20 allow the computer to communicate with other devices via a computer network, such as a local area network (LAN) or wide area network (WAN), or the internet, and may comprise a modulator/demodulator (MODEM) a router, a cable, and and/or USB or Ethernet port. Memory 16 stores instructions for performing the exemplary method as well as the processed data.

The digital processor 12 can be variously embodied, such as by a single-core processor, a dual-core processor (or more generally by a multiple-core processor), a digital processor and cooperating math coprocessor, a digital controller, or the like. The digital processor 12, in addition to controlling the operation of the server computer 38, executes instructions stored in memory 16, for performing the method outlined in FIG. 2.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The exemplary instructions 14 include an NLU component 40, a Dialogue Manager 42, and an NLG component 44.

The NLU component 40 processes text 46 input to the system 10 by the customer device 26 by automatically extracting and understanding the information contained in the text, such as identifying the customer's needs and translating the customer's needs into a formal language which the system can process. During training, the NLU component 40 may perform analogous processing on the customer-agent dialogue 24 stored in the knowledge base 22 to generate a representation for each different customer problem 48 and/or agent solution 50.

The NLU component 40 may include a parser 52, such as a syntactic parser, which implements specific rules, referred to as an action grammar 54, which may be written on top of conventional parser rules. The parser 52 can extract lexical, syntactic, and semantic information or dependencies from a dialogue text that provide context in which words occur. Specifically targeted types of information, such as named entities (e.g., people names, organization names, product names, dates, and locations), numerical values, and semantic relations (e.g., London is-the-capital-of England) can also be extracted. The information can be extracted sentence by sentence, resulting in a set of dependencies, which can each be represented by a dependency graph 56.

The sentences analyzed by the parser 52 can reveal dependency patterns existing in different bodies of dialogue text. For example, two sentences in which only one noun (e.g., a named entity) is different can be represented with very similar dependency patterns. The noun could identify a device such as a smart phone, for example, an iPhone, Samsung, or Windows phone. With the help of the action grammar 54, these different nouns can then be replaced by a variable, such as a device variable, making the dependencies extracted by the parser 52 more abstract. Therefore, the parser 52 can reveal dependency patterns existing in several sets of dependencies, or dependency graphs 56, which can be combined to form a dependency template 58. Each template 58 represents a specific type of sentence corresponding to a set of dependencies. This correspondence can be referred to as the planner 60. Thus, the planner 60 contains the mapping from the initial customer-agent dialogue 24 parsed with the NLU component 40 to the extracted dependency graphs 56 and dependency templates 58. The output of the planner 60 is then the linguistic dependency templates 58, each template linked to the words extracted from the natural language dialogues.

The dependency templates 58 associated with the planner 60 can be stored in the knowledge base 22 with the corresponding words and content of the customer-agent dialogue 24 from which they were derived. When a customer poses a question, the parser 52 can analyze the question using the method illustrated above and extract a dependency template 58 based on the context of the customer's question. The variables in the extracted dependency template 58 can be replaced with the actual words of the customer-agent dialogue 24 stored in the knowledge base 22.

The dialogue manager 42 includes a comparison component 62 for comparing the NLU processed customer inquiry to see if it matches any of the NLU processed customer problems 48 or other content in the knowledge base 22.

The NLG component 44 uses the action grammar 54 to generate an answer or response 64 to the customer in the same natural language, according to projection rules. In particular, a surface generator 66 computes the correct form of grammatical relationships in the response 64, according to the existing action grammar 54 agreement rules of the target language (e.g., English or French). The structure realizer 68 computes the correct morphology for the words, according to the existing action grammar 54 morphemes of the target language (e.g., English or French).

The exemplary system provides for natural language generation by extracting templates for matching patterns. The patterns are extracted from a corpus of text sentences 24, by extraction of dependencies, and then transforming those dependencies back into well-formed sentences.

Figure 2:
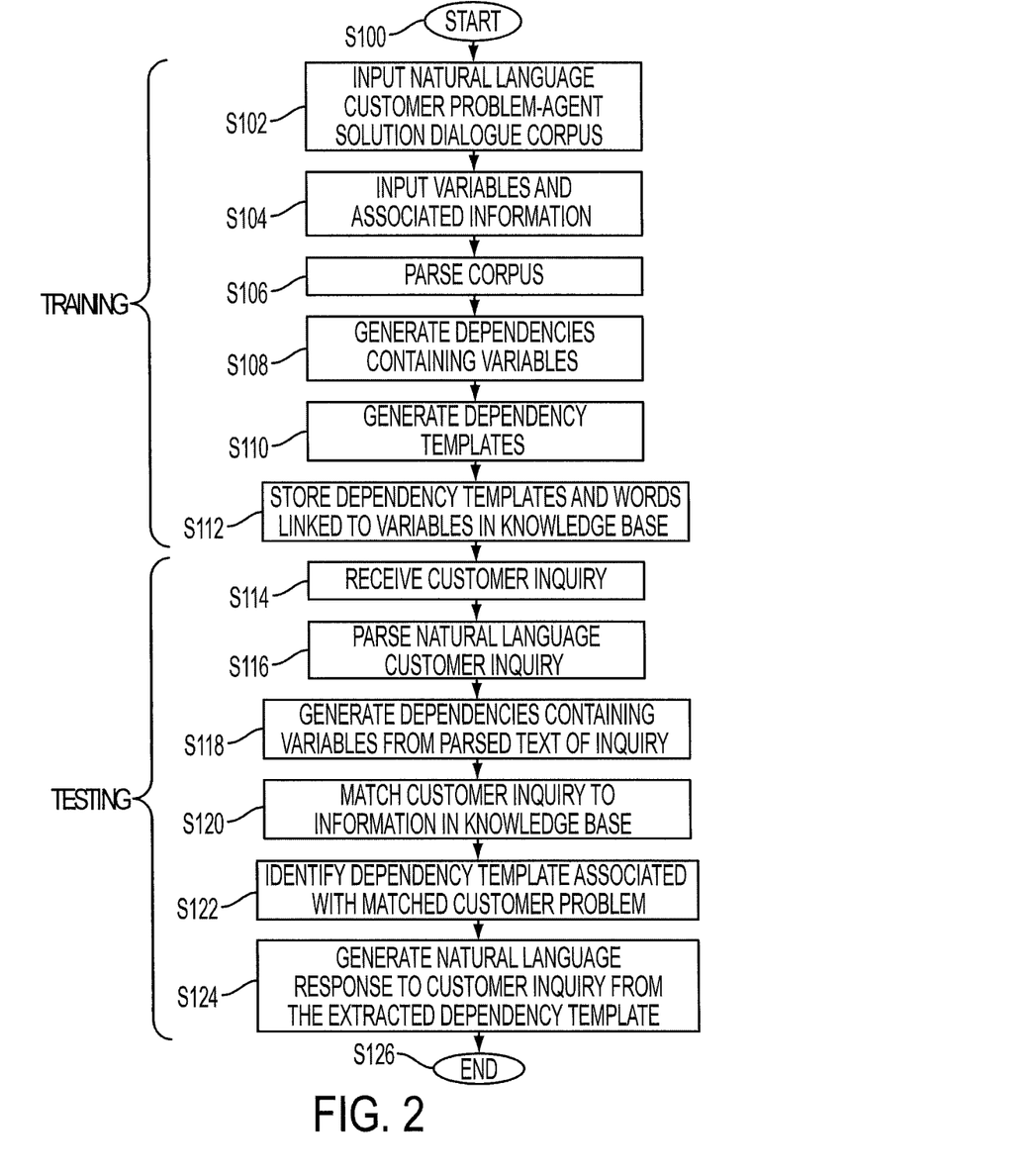
FIG. 2 is a flow chart illustrating a method for natural language generation in accordance with one embodiment.

FIG. 2 illustrates one embodiment of an exemplary method which may be performed, at least in part, by the system illustrated in FIG. 1. The method begins at S100.

At S102, the corpus 24 of customer problem-agent solution dialogues is input into the NLU component 40 of the system 10.

At S104, a predefined set of variables, each with an associated list of words/phrases may be input to the system, e.g. from the agent device. Each variable may be associated with a part of speech, such as noun, verb, etc. The words/phrases to be replaced may be manually selected and may depend on the dialogue topic (e.g., iPhone Wi-Fi connectivity problems).

At S106, the parser 52 identifies the customer problem 48 sentences of the dialogue and extracts the respective dependencies. The parser 52 also identifies the agent solution 50 sentences of the dialogue and extracts the respective dependencies. The extracted dependencies may each be in the form of a set of dependencies or dependency graphs 56.

At S108, for both the customer problem sentences 48 and agent solution sentences 50, dependency graphs 56 are generated, at least some of the dependency graphs containing variables. In particular the parser 52 replaces certain words and/or phrases with variables. For example, the nouns and noun phrases in the sentences representative of the dialogue topic (e.g., "iPhone" and/or "Wi-Fi") can be replaced by variables. The verbs in the sentences representative of the dialogue topic (e.g., "connect") may also be replaced with a respective variable. This makes the extracted dependencies more abstract.

At S110, the NLU component 40 generates dependency templates 56 from the dependency graphs generated from the parsed agent solution sentences 70. Common dependencies between the extracted dependency graphs 56 are merged into one representation. The merged dependencies are structured according to the rules in the generation grammar 54 and may be in the form of a dependency template 58. The mapping from the initial customer-agent dialogue 24 input at S102, to the generated dependency graphs 56 at S108, to the generated dependency templates 58 in the present step S110 can be referred to as the planner 60.

At S112, the extracted dependency templates 58 are stored in the knowledge base 22, which encompasses the core of the planner 60. Each dependency template 58 is associated to at least one topic in the customer problem-agent solution dialogue corpus 24. The dialogue topics can be organized in the knowledge base 22 by a designated case type. The actual words which were assigned a variable in step S108 can also be stored in the knowledge base 22 as a list of words which can replace the variable. Once the dependency templates are stored and indexed by topic and associated variables, the training phase is over and need not be repeated for each customer inquiry.

At S114, a customer inquiry 46 is received by the system 10. The customer inquiry may be input to the system in the form of text or a voice recording. In the case of a recording, a speech to text converter may be used to convert the voice recording to text. At S116, the customer inquiry 46 is input into the NLU component 40 and parsed.

At S118, the parser 52 extracts the dependencies in the customer inquiry. The extracted dependencies may be in the form of a set of dependencies or a dependency graph 56. Each of the predefined set of words/phrases is replaced by a corresponding variable, as in step S102.

At S120, the NLU-processed customer inquiry is compared, by the dialogue manager, with the NLU processed customer problem-agent dialogue corpus 24 to see if it matches any similar content in the knowledge base 22. Similar content can include nouns referring to the same device and verbs referring to the same actions performed on the device, for example.

If a match is made at S120, then at S122 an associated dependency template 58 is identified from the knowledge base 22 by the planner 60 of the NLG component 44. If no match is found, the input query 46 may be forwarded to an agent for manual processing.

At S124, the dependency template 58 identified in S120 is used to generate a natural language response to the customer inquiry input at S114. This includes replacing the variables in the corresponding dependency template 58 for an agent solution with the corresponding actual words in the knowledge base 22, and forming a grammatically correct sentence based on the action grammar 54 from which the dependency template was built.

The method ends at S126.

Various steps of the method are now discussed in detail.

Natural Language Understanding to Build the Knowledge Base (S102-S112)

The structure of the knowledge base 22 is built with natural language input. In particular, text (or processed recordings) of customer-agent dialogues, which can be generated from a call center, provide a corpus 24 of training sentences from which the knowledge base 22 can be built. The system 10 has access to the customer-agent dialogue corpus 24, which can include text summaries of customer-agent dialogues and/or converted recordings, such as audio files of customer-agent dialogue which have been converted to text. The text corresponds to customer problems (inquiries) 48 and agent solutions (responses) 50, described in a natural language such as English or French. In the event that the customer problem 48 and/or agent solution 50 are input into the system as an audio recording, the system 10 may include in memory 16 a speech-to-text conversion component configured for converting the recording into a text document in a natural language.

For a call center answering customer problems with a device or class of devices, the agent solutions 50 generally include a sequence of main steps provided by the agent to the customer, ordered in the order in which they are to be performed on the device, that are designed to effect a repair of, or modification to the device. The customer problem 48 and agent solution 50 may be input to the system as a voice (audio) recording (or converted to text prior to input).

The customer-agent dialogue corpus 24 generally includes a variety of topics from which the corpus can be organized. For example, a dialogue topic could relate to Wi-Fi connectivity problems with a smart phone, such as an iPhone.

The sequence of main steps to be performed may be stored in the knowledge base as one of a set of solution descriptions 70, each solution description being associated with a known problem with the device, which is described in a problem description 72. The problem description, together with one or more associated solution descriptions, may be stored in the knowledge base as a case 74. The agent accesses the knowledge base to find a case matching the customer's inquiry 46 and a solution description 70 is read to the customer by the agent. As will be appreciated, some deviations from the prescribed text of the solution description 70 may be introduced by the agent or by incorrect transcription such that the agent solution 50 may not exactly match the solution description.

The sentences which correspond to the various topics in the customer-agent dialogue corpus 24 can thus be organized into cases representative of the dialogue topics, based on the textual content. For example, a case 74 can relate to a particular model of a device or a class of two or more models of the device. Each case can further be sub-organized into one or more customer problem-agent solution sets, each solution description including one or more steps which are to be performed in solving the problem. In an alternative embodiment, dialogue topics can be organized in to cases which relate to a particular problem type. Each case can further by sub-organized into a particular model of a device or a class of two or more models of the device, each device model or model class including one or more agent solution descriptions 70.

The number of cases 74 is not limited, but is generally at least 10, or at least 100. Each problem description 72 is associated with at least one solution description 70, but may be linked to any number, such as 2, 3, 4, 5, 10, or more (but generally, fewer than all the possible solutions descriptions in the knowledge base). Although two, or more, of the customer problem descriptions 72 may have a common solution description 70, in general, at least some of the cases each have a different set of solutions from others of the cases. The organized case structure of the customer-agent dialogue corpus can be maintained in the knowledge base 22 according to the same structure.

The exemplary method used to process the content of customer-agent dialogue corpus 24 and build the knowledge base 22 is based on the use of a dedicated NLU grammar 54. The processing of the corpus 24 is done off-line, i.e., before a customer poses a question 46 to the system 10. In this regard, the corpus 24 of customer-agent dialogues provides a large set of training sentences which can be processed by the NLU 40 to build the templates for the knowledge base 22.

Specifically, the customer-agent dialogue corpus 24 is input to the NLU component 40 of the system 10. The NLU parser 52 identifies the customer problem 48 sentences in the dialogue and the associated agent solution 50 sentences. The dialogue is input to the system 10 as a natural language text and processed using the specific action grammar 54 that is built from vocabulary in use in the corpus 24. Each natural language text input into the NLU component 40 may correspond to at least one case in the knowledge base. The parser 52 tags (indexes) the problem description 48, together with one or more associated solution descriptions 50, resulting in a tagged (annotated) corpus which may be stored in the knowledge base. The parser also parses the natural language problem description and associated solution description to extract dependencies. A set of dependencies can be represented by a dependency graph 56. Dependency graphs include text tagged or otherwise labeled according to morphological rules of grammar (parts of speech or POS), syntactic dependencies between words or phrases, and semantic dependencies between the particular syntactic dependencies.

Thus, the NLU component 40 with the assistance of the parser 52 builds a knowledge base which may be indexed according to the normalized forms of the words that occur in the problem descriptions, and optionally also the solutions, or parts thereof, and their synonyms, as well as syntactic units that they contain (i.e., the dependency graphs). The normalized word forms that occur in the problem and solution descriptions (or cases) are linked to the dependency graphs through the use of variables. The existence of a shared variable creates a link between a case and a dependency.

The morphological rules of grammar applied by the parser 52 include tokenization, POS tagging, and disambiguation. In tokenization, the sentences, or other text sequences are broken down into their constituent words, and other text elements. In initial POS tagging, each token is associated with one or more parts of speech, e.g., based on a lexicon (or none, if the word is not recognized). In disambiguation, each word token is associated with one, most probable, part of speech, e.g., when two or more have been identified, or when none has, e.g., based on the role of the token in the sentence. Coreference resolution may also be performed so that pronouns may be tagged with the Object (e.g., noun phrase) to which they relate.

POS tagging further encompasses the tagging of actual words or terms with specific lexical categories where present. Lexical categories such as nouns, action verbs, adjectives, and adverbs which are representative of problem descriptions or solution descriptions within each case 74 are tagged and stored in the knowledge base 22.

The parser 52 may also assemble these tagged words into a list of words whose presence in a knowledge base can indicate relevance to a case. The list of terms assembled by the parser may also be grouped into categories relevant to each case. For example, a part names category could contain nouns or noun phrases such as volume rocker, power button, and camera. As another example, a device name category could contain the nouns iPhone, Samsung, or Windows phone. As a further example, a symptom category could contain the terms Wi-Fi, volume, and power switch. As yet a further example, an actions category could contain action verbs (e.g. as the infinitive form) which correspond to actions performed on the device such as connect, activate, charge, and the like. Each case title, tagged term, list of terms, and/or categories within a case can be assigned a different variable by the parser. This variable can be in the form: "#x" where x is a digit, or any other variable deemed appropriate by the linguist. This information identified by the parser is stored along with at least one associated case 74 in the knowledge base 22.

In some embodiments, the parser 52 comprises a syntactic parser for analyzing an input text string in which the parser applies a plurality of rules which describe syntactic properties of the language of the input text string: U.S. Pat. No. 7,058,567, issued Jun. 6, 2006, entitled NATURAL LANGUAGE PARSER, by Aït-Mokhtar, et al., and Aït-Mokhtar, et al., "Robustness beyond Shallowness: Incremental Dependency Parsing," Special Issue of NLE Journal (2002), the disclosures of which are incorporated herein by reference in their entireties by reference. Similar incremental parsers are described in Aït-Mokhtar "*Incremental Finite-State Parsing,*" in *Proc.* 5th Conf. on Applied Natural Language Processing (*ANLP* '97), pp. 72-79 (1997), and Aït-Mokhtar, et al., "*Subject and Object Dependency Extraction Using Finite-State Transducers,*" in Proc. 35th Conf. of the Association for Computational Linguistics (*ACL* '97) *Workshop on Information Extraction and the Building of Lexical Semantic Resources for NLP Applications*, pp. 71-77 (1997). The syntactic analysis may include the construction of a set of syntactic relations (dependencies) from an input text by application of a set of parser rules. Exemplary methods are developed from dependency grammars, as described, for example, in Mel'čuk I., "Dependency Syntax," State University of New York, Albany (1988) and in Tesnière L., "Elements de Syntaxe Structurale" (1959) Klincksiek Eds. (Corrected edition, Paris 1969).

The parser 52 can apply syntax and semantic rules of grammar to extract syntactic and semantic dependencies between specific elements. A syntactic dependency, or rule, identifies the correct sequence of the syntactic categories in a sentence, usually in the form of a parsed graph such as dependency graph 56. A syntactic rule is based on one or more linguistic elements including the surface form, the lemma form of words, a set of syntactic nodes, a set of features, and a set of dependencies.

The surface form is the character string that represents a word in a text (for example, the word activated in "can you tell me if the Wi-Fi is activated?"). The lemma form is the base form of a word (activate is the lemma form of activated in "can you tell me if the Wi-Fi is activated?") Generally, a syntactic rule includes one or more syntactic nodes. A syntactic node may be a lexical category (such as noun, verb, adjective) or a phrasal category (such as a noun phrase (NP), verbal phrase (VP), adjectival phrase (AP), or prepositional phrase (PP)) in which words are grouped around a head. A head may be a noun, a verb, an adjective, or a preposition. Around these categories, the other minor categories, such as determiner, adverbs, pronouns etc. are lumped. The denotation noun, verb, NP, etc. are not mandatory and may change according to the linguist.

Together, each syntactic node in a dependency graph 56 represent a hierarchy of the rules within the action grammar 54. The hierarchy can include root nodes which represent the complete sentence, syntactic sub nodes which represent the phrasal categories of the sentence, and syntactic leaf nodes which represent lexical category of the actual words of the input sentence.

In the exemplary embodiment, the leaf nodes representing the actual words of the input sentence have been replaced by a variable. As in the process described above with respect to tagging the natural language text, the variables used in the dependency graphs can be the form "#x" where x is a digit. Replacing the actual words with variables makes the dependency graphs more abstract, but also links the dependency graphs to the cases with a matching variable. In other words, each dependency graph is linked with the text of an associated case in the knowledge base 22.

A dependency is a directed link between first and second words (or phrases) in which one, two, or more syntactic nodes are bound together. Dependencies can be of various classes which denote a linguistic relationship between syntactic nodes such as a subject relation between a noun and a verb. Although the linguistically related words or phrases of a dependency may be next to each other in the sentence, they can be spaced by other words. For example, in the sentence "the Wi-Fi is activated" "the Wi-Fi" is a noun phrase and is the subject of the verb "is." This relationship can be expressed as a dependency. Other dependencies include object-verb dependencies, verb-argument dependencies, and modifier dependencies (e.g., locative or temporal modifiers), and the like.

A parse of numerous sentences in the customer-agent dialogue corpus 24 using the rules stored in the action grammar 54 can reveal dependency patterns existing between the sentences. In other words, when the parser 52 analyzes and outputs several sets of dependencies, or dependency graphs 56 for the sentences belonging to a particular case in the knowledge base 22, patterns showing similar syntactic and semantic dependencies will be identified. Furthermore, the parser 52 will tag the specific syntactic categories (POS) of the actual words unique to each sentence's dependency graph, replace or associate the actual words with a variable as discussed above, and store the actual words and corresponding variables related to the specific case being analyzed. The variable can simply be in the form of "#x" where x is a digit or other symbol or sequence of symbols, or can alternatively be a unique variable assigned according to special parser rules. In either case, the assigned variable links the dependency graphs to the text of the knowledge base 22

The dependency graphs 56 parsed from the sentences of a particular case in the knowledge base, each having similar lexical categories and syntactic patterns between their nodes, can easily be merged into a single representation, or dependency template 58. That is, the common elements can be merged into one representation (e.g., dependency node or leaf) in the dependency template 58. Different elements, which are usually lexical ones, are represented by the variable assigned by the parser discussed above. A merged dependency template in turn provides a rule for the merging of two sentences. The following rule provides an example:

If (subject_1 (#1,#2) & subject_2(#1,#2) & object_1(#1, #3) & object_2(#1,#4)).

This rule can be read as: If there are two subject dependencies for the same verb (i.e., verb #1) and the same noun (i.e., noun #2), originating from two different sentences, and if there are two object dependencies for the same verb (i.e., verb #1) and different adjectives (i.e., adjective #3 and #4), then only one subject dependency and one object dependency are kept. Adjectives #3 or #4 can either be used individually to generate a sentence from the rule, or a new conjunction dependency can be created between the two adjectives #3 and

4, depending on the context of the sentence. For example, the dependency conjunction_1(#3,#4) can be added to the rule.

The merged dependencies are structured according to the rules in the action grammar 54 used in the NLU component 40, which in turn is used as the generation grammar to build a response 64 from the dependency templates 58. This generation grammar 54 assigns the correct order to the nodes of each dependency template 58 so that the final generated sentence is arranged in grammatically correct order. Each dependency template 58 is stored in the knowledge base 22 under its corresponding case.

Therefore, the dependency template 58 will include the syntactic and semantic elements common amongst all of the parsed dependency graphs 56, and will also include variables linked to the knowledge base 22 so that correct word content is chosen for the final generated sentence. Thus, each case in the knowledge base will have a set of tagged sentences, represented by a set of dependencies or dependency graphs 56, and at least one associated dependency template 58. The dependency template 58 represents a type of sentence which would appear in the associated organized case of the knowledge base 22, and also contains the information needed to generate a sentence representative of a type of sentence which would appear in the associated organized case of the knowledge base.

Natural Language Understanding of Customer Input (S114-S120)

In an exemplary embodiment, the customer interacts with the system 10 and the knowledge base 22 through an automated machine or virtual agent 80 operating as a cloud-based service. The virtual agent 80 accesses the knowledge base 22 directly and identifies the corresponding NLU processed customer problem 48 in the knowledge base to which the customer's present inquiry 46 refers, assuming that there is one.

The exemplary method for understanding a customer question or inquiry is based on the same NLU component 40 used to process the content of customer-agent dialogue corpus 24 in the knowledge base 22. In particular, the customer can input an inquiry 46, e.g., in the form of a question, into the system 10 at I/O interface 18 using the customer device 26. The customer inquiry can be input to the system as a voice (audio) recording or submitted as text, e.g., from an email or instant message, based on a verbal or textual problem description. In the event that the customer inquiry is input into the system as an audio recording, the system 10 may use the optional speech to text conversion component configured for converting the recording into a text document in a natural language.

The customer inquiry 46 is processed and compared with one or more customer problem descriptions 48 and corresponding agent solutions 50 in the knowledge base 22. The customer question or inquiry can be processed with the parser 52 and action grammar 54 of the NLU component 40 in the same way as described above with respect to the customer-agent dialogue corpus. In an alternative embodiment, the system 10 can optionally include a dedicated problem description component specifically configured for processing the customer inquiry.

In either embodiment, the NLU component 40 extracts the syntactic and semantic information from the customer inquiry in a manner similar to the information extracted during processing of the customer-agent dialogue corpus 24 when building the knowledge base 22. That is, using the parser 52 and action grammar 54, the NLU component 40 extracts the linguistic dependencies in the sentence which represents the customer's inquiry. In addition, the NLU 40 component identifies the specific syntactic categories (POS) of the actual words unique to the customer's inquiry, replaces the actual words with the same variable used for the corpus processing, and stores the actual words and corresponding variables. The processed customer inquiry may be stored in memory 16, or may be temporarily stored in an optional data memory.

The dialogue manager 42 can include a comparison component 62 for comparing the NLU-processed customer inquiry to see if it matches any of the NLU processed customer problems 48 or other content in the knowledge base 22. This may include determining whether a match exists between the assigned variables, sequence of the syntactic categories, and/or syntactic dependencies of the NLU-processed customer inquiry and the NLU-processed customer problems 48 in the knowledge base 22. In other words, a representation of the words in the customer inquiry 46 is built to find cases containing text units and/or syntactic structures matching the query words. The process of matching the text to knowledge base cases can be performed as described in detail in U.S. Pub. No. 20070192085, published Aug. 16, 2007, entitled NATURAL LANGUAGE PROCESSING FOR DEVELOPING QUERIES, by Frederic Roulland, et al., and U.S. Pub. No. 20080091408, published Apr. 17, 2008, entitled NAVIGATION SYSTEM FOR MANUALS, by Frederic Roulland, et al., the disclosures of which are herein incorporated by reference in their entireties.

If a match is found, the dialogue manager 42 sends the information identifying the match to the NLG component 44. The NLG component 44 uses this data to identify one or more dependency templates 58 which can be used to answer the customer inquiry. Depending on the complexity of the customer inquiry, deep syntactic and/or semantic information may not need to be compared. Since a customer inquiry may not have the same degree of formalism as an agent solution, different techniques may be used to determine the degree of similarity between the customer inquiry and the NLU-processed customer problems 48 or other content in the knowledge base 22. For example, the comparison component 62 may use keyword matching to determine a match between the variables assigned to the actual words in the customer inquiry and the content of the knowledge base 22. In addition or in the alternative, the system 10 may accept a relatively low threshold of similarity for customer inquiries and NLU-processed customer problems 48 to be considered a match.

Generating a Natural Language Answer (S122-S124)

The exemplary method is based on the use of a dedicated NLG component 44 to generate an answer in natural language. A customer inputs an inquiry in natural language, and based on the knowledge base 22 built by the NLU-processed customer-agent dialogue corpus 24, the system 10 generates a response. When the comparison component 62 identifies a match as described above, the dialogue manager 42 informs the NLG component 44 of the type of answer that should be generated. In particular, the dialogue manager 42 tells the NLG component 44 which type of dependency template 58 should be used to create a response 64. If a match is not made, the system 10 can optionally contact a live agent to assist in answering the customer's inquiry.

The planner 60 provides the information sought by the dialogue manager 42, and the dialogue manager retrieves a dependency template 58 from the knowledge base 22 from which an answer can be built. The planner 60 identifies, from the dependency template 58, what information should be mentioned, how the information should be ordered, combined, and communicated, and what content should be chosen (i.e., based on the variables linked to the knowledge base for proper content selection of words)

In other words, the dependency template 58 contains a hierarchy of rules which is followed in order to generate a natural language response. The rules in the dependency template 58 may have a pattern which follows the graph structure in a top-down manner—i.e., starting with the highest level nodes and working down, following the text from left to right. The NLG component 44 analyzes dependency templates 58 according to the order in which these nodes occur along a top-down algorithm. This order determines the way the natural language response 64 is generated. Each node is a rule or syntactic link between two words and an indication of how these two words should agree. For instance, a subject dependency between a noun and a verb indicates that the noun should occur before the verb, and that both the noun and the verb should agree. As such, the system 10 does not require a very complex generation grammar as most of the linguistic information has been found by the syntactic parser beforehand. Once analyzed by the NLG, each dependency template 58 is reconfigured as a single sentence responsive to the customer inquiry.

The surface generator 66 takes as input the syntactic information contained in the dependency template 58 provided by the planner 60. That is, the surface generator 66 applies the corresponding rules from the generation grammar 54 to output a sentence having the correct expression of words according to the grammatical relationships normally used in the target natural language (i.e., English or French). For example, a set of projection rules written for the surface generator 66 in the action grammar 54 can provide the proper auxiliaries for the various tenses of the target language and/or the syntactically correct pronominalization. The projection rules in the action grammar 54 for the surface generator 66 also allow for aggregation of sentences. That is, sentences or phrases sharing some common words can be merged together. For instance, the surface generator 66 can merge two sentences sharing the same verb and the same subject into one sentence and join the different sub-parts with a conjunction. Projection rules in the action grammar 54 for the surface generator 66 also can provide the correct inflection for verbs, capitalize first letters or proper nouns, and insert punctuation when necessary.

Finally, the structure realizer 68 converts the sentence representation provided by the surface generator 66 into a final string and organizes the different sentences into paragraphs. Thus, the NLG component 44, with the planner 60, surface generator 66, and structure realizer 68 outputs a natural language answer to the customer which is grammatically correct and meaningful.

Without intending to limit the scope of the exemplary embodiment, the following Example illustrates the application of the method.

Example Application

A significant difference between a word template approach and the dependency template approach in the exemplary system 10 is shown in the example below. The example also illustrates how the exemplary system performs the exemplary method.

The sentences in Table 1 represent a set of sentences corresponding to an agent solution, or a first sequence of actions or steps, which could occur in a customer problem-agent solution dialogue.

TABLE 1

Set of training sentences used to create dependency template
Training sentences

| | |
|---|---|
| 1. | Can you tell me if the Wi-Fi is activated? |
| 2. | Can you check if the touch screen is functional? |
| 3. | Is the Wi-Fi turned on? |

The sentences in Table 1 correspond to an agent's response to a customer inquiry or problem statement. For example, in response to a customer inquiry which states "I cannot connect to the internet," sentences 1 and 3 might be provided in response as the first step in a solution description, which may include a sequence of actions to diagnose the customer's problem. Sentences 1 and 3 are similar in the sense that they are essentially the same step in a sequence. However, the formalism in sentences 1 and 3 is different, which may correspond to an incorrect transcription from the text of the solution description introduced by an agent. At first glance, sentence 2 appears unrelated to sentences 1 and 3. However, sentence 2 could be a response to a different customer inquiry or may represent a deviation from the prescribed text of the solution description introduced by an agent.

The sentences in Table 1 can be organized under a case title designated by the device name, such as "iPhone." A sub case to the device name could be a "connections" sub case, under which a customer-agent dialogue relating to connection issues is stored. The customer-agent agent dialogue contains a set of problem statements or descriptions and associated solution descriptions. For purposes of this example, a customer problem statement of "I cannot connect to the internet" can be assumed. The training sentences in Table 1 are representative of a set of solution descriptions responsive to the problem statement which may be offered by the agent.

The italicized words in Table 1 will be considered. That is, the nouns or noun phrases Wi-Fi and touch screen will demonstrate words replaced by a variable which are representative of the case "iPhone" and/or sub-case "connections." Thus, Wi-Fi and touch screen are extracted by the parser and replaced by the variable @MARK-UP@ after being processed by the NLU component.

Figure 3:
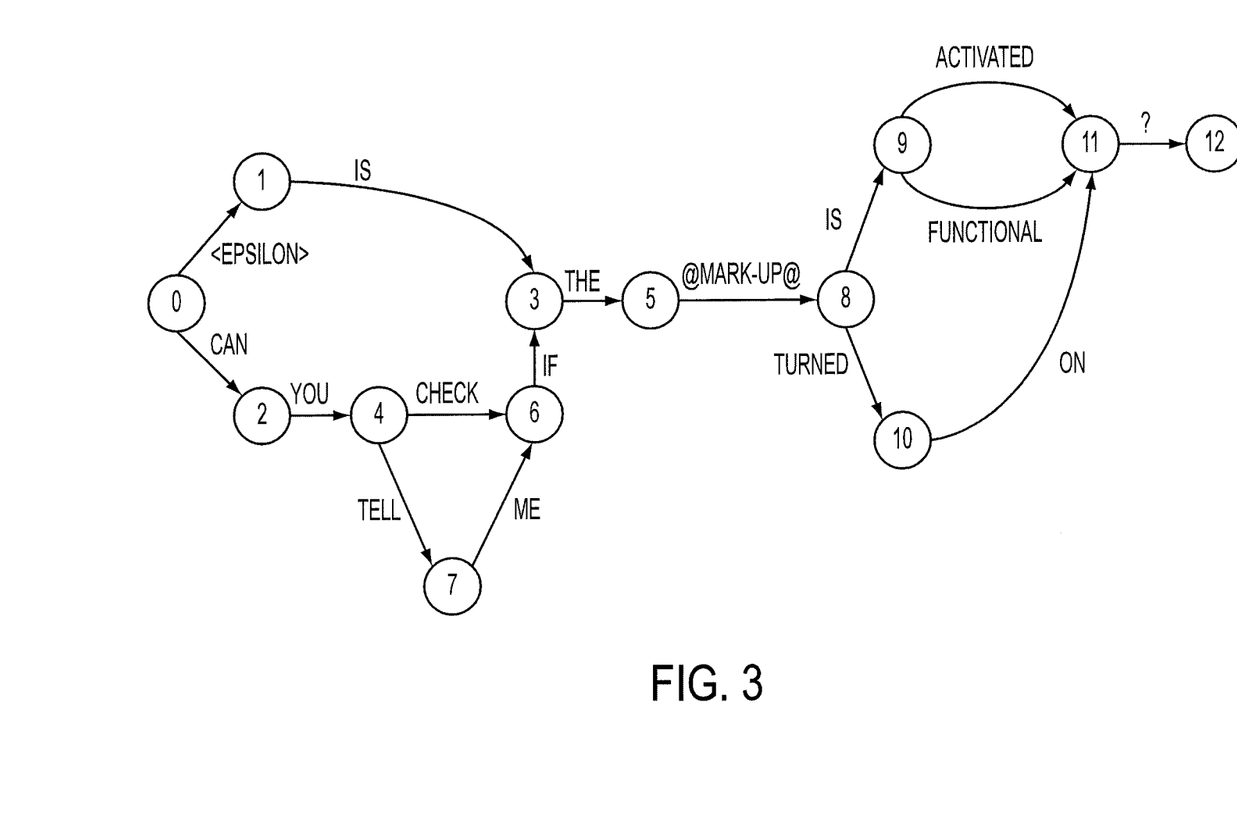
FIG. 3 illustrates a method for natural language generation using the word template approach.

In a word template approach, the non-linguistic input is mapped directly to the linguistic surface structure. This structure contains gaps which are replaced by linguistic structures which do not contain gaps. The word template approach to natural language generation is generally represented by a confusion network, as shown in FIG. 3. The confusion network extracted in FIG. 3 representing the word template approach will generate the sentences shown in Table 2 below. Briefly, the results show that four out of the nine sentences which can be generated using the word template are grammatically erroneous.

TABLE 2

Set of sentences generated with a word template

| | Sentences generated | No Error? |
|---|---|---|
| 1. | is the @MARK-UP@ turned on? | ✓ |
| 2. | can you tell me if the @MARK-UP@ turned on? | |
| 3. | can you tell me if the @MARK-UP@ is functional? | ✓ |
| 4. | can you tell me if the @MARK-UP@ is activated? | ✓ |
| 5. | is the @MARK-UP@ is functional? | |

TABLE 2-continued

Set of sentences generated with a word template

| | Sentences generated | No Error? |
|---|---|---|
| 6. | is the @MARK-UP@ is activated? | |
| 7. | can you check if the @MARK-UP@ is functional? | ✓ |
| 8. | can you check if the @MARK-UP@ turned on? | |
| 9. | can you check if the @MARK-UP@ is activated? | ✓ |

Specifically, sentences 2, 5, 6, and 8 are grammatically incorrect. This is because, without the introduction of linguistic features, the word template approach has poorer and less-varied output capabilities. By introducing linguistic features in the templates, many of these errors would be avoided.

Figure 4:
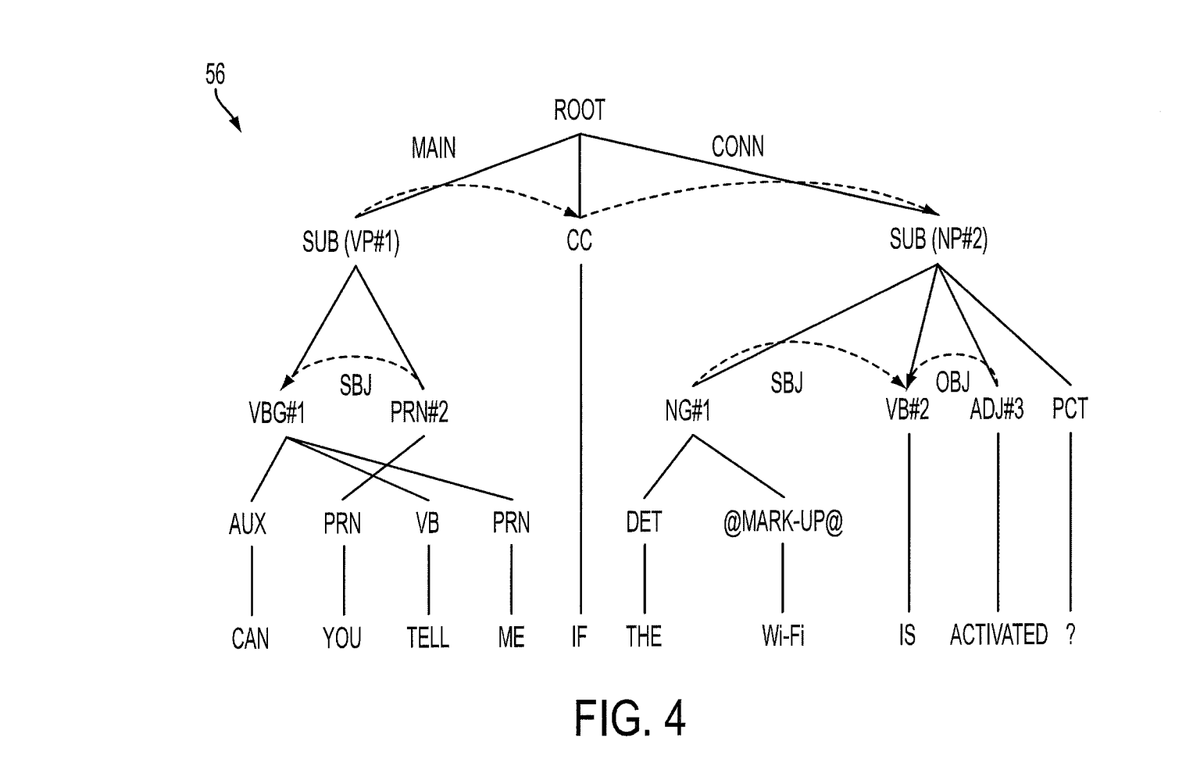
FIG. 4 illustrates a dependency graph extracted from a training sentence using natural language understanding.

Using a parser 52 and associated action grammar 54, dependencies can be extracted from the training sentences listed in Table 1. For example, FIG. 4 shows the result of the parsing process for the first training sentence. As can be seen in FIG. 4, sentence 1 has been tagged or labeled according to the rules of the action grammar used in the parser. Sentence 1 has also been tagged with variables including "#x", where x is a digit, and @-MARK-UP@. The variable "#x" corresponds to a list of terms or a category within a case in the knowledge base where an appropriate word choice may be found. The variable @-MARK-UP@ refers to the actual word in the list or words or categories which is inserted at a particular place in a response to a customer inquiry. FIG. 4 represents the output of the parser 52 in system 10, as a dependency graph 56. Training sentences 2 and 3 will similarly be parsed, applying the same action grammar used for sentence 1. In a dependency graph, each child node in the graph is directly linked to exactly one parent node. Each child node has 0, 1, or more child nodes. The child nodes having 0 child nodes (which may be referred to as the leaves) are the words of the sentence.

FIG. 4 shows the output of the parser after parsing the first training sentence. As shown in FIG. 4, the output is in the form of a set of dependencies, or a dependency graph. First, the parser identified the surface forms of the input sentence, or the actual words which make up the root sentence, and their lemma forms. The ROOT node is identified as the entire sentence as "Can you tell me if the Wi-Fi is activated?" Next, starting with the phrasal categories, the syntactic nodes are identified. The phrasal categories include: the first sub node ("SUB"), or verb phrase ("VP") "can you tell me," and the second sub node ("SUB"), or noun phrase ("NP") "the Wi-Fi is activated." This VP has been tagged with the variable "#1."

The lexical category syntactic nodes are then identified under the phrasal categories. Under the VP#1, a verbal word group ("VBG") and a pronoun ("PRN") are identified. The VBG has been tagged with the variable "#1" and the pronoun with variable #2. The VBG consists of the auxiliary ("AUX") "can," verb ("VB") "tell," and pronoun ("PRN") "me." The PRN is identified as "you." Under the NP, a nominal word group ("NG") includes a determiner ("DET") "the," a noun "Wi-Fi," a verb ("VB") "is," an adjective ("ADJ") "activated," and a punctuation mark ("PCT") "?". In addition, the NP has been tagged with the variable #2, the NG with #1, the VB with #2, and the ADJ with #3. Significantly, the noun "Wi-Fi" has been replaced by the variable @MARK-UP@. The VP and NP sub nodes are connected by the coordination ("CC") "if."

The parser then identified the dependencies between the syntactic nodes. These syntactic dependencies, or rules, focus on linking or connecting the various syntactic nodes. A main clause ("MAIN") is identified as being connected to a subordinate clause in an independent-dependent dependency ("CONN"). A subject ("SBJ") dependency is identified between the VBG#1 and PRN#2 nodes of the VP#1. A subject dependency ("SBJ") between the NG#1 node of the NP#2 and the VB#2 node is also identified. An object dependency is identified in the NP#2 between the ADJ#3 node and the VB#2 node.

The second and third sentences will be similarly parsed to create dependency graphs similar to FIG. 4. Selected actual words in the second and third sentences will also be replaced by variables. A parsing of the second and third sentence will show lexical categories of words similar to those in the first sentence, including a verb, a noun or noun group, and an adjective. The parsed second and third sentences will also have similar syntactic dependencies, including a subject relation between a verb and a noun group, and an object relation between a verb and an adjective, both under a noun phrase node.

The second sentence, similar to the first sentence, will also have a verb phrase VP#1 which is a subordinate clause to a noun phrase NP#2. This is can be shown by the MAIN designation, as used for the first sentence in FIG. 4, which indicates that the noun phrase NP#2 is the main clause which is independent from the subordinate, or dependent, verb phrase VP#1. The coordination ("CC") in both the first and second sentences links NP#2 and VP#1, and the independent-dependent dependency connects ("CONN") NP#2 to VP#1. The verb phrase node of the second sentence will also have similar lexical categories to the first sentence, including a verb group VBG and a pronoun PRN. The verb group VBG and pronoun PRN of the verb phrase in the second sentence also have a subject dependency between them, where the pronoun PRN is the subject of the verb group VBG.

Figure 5:
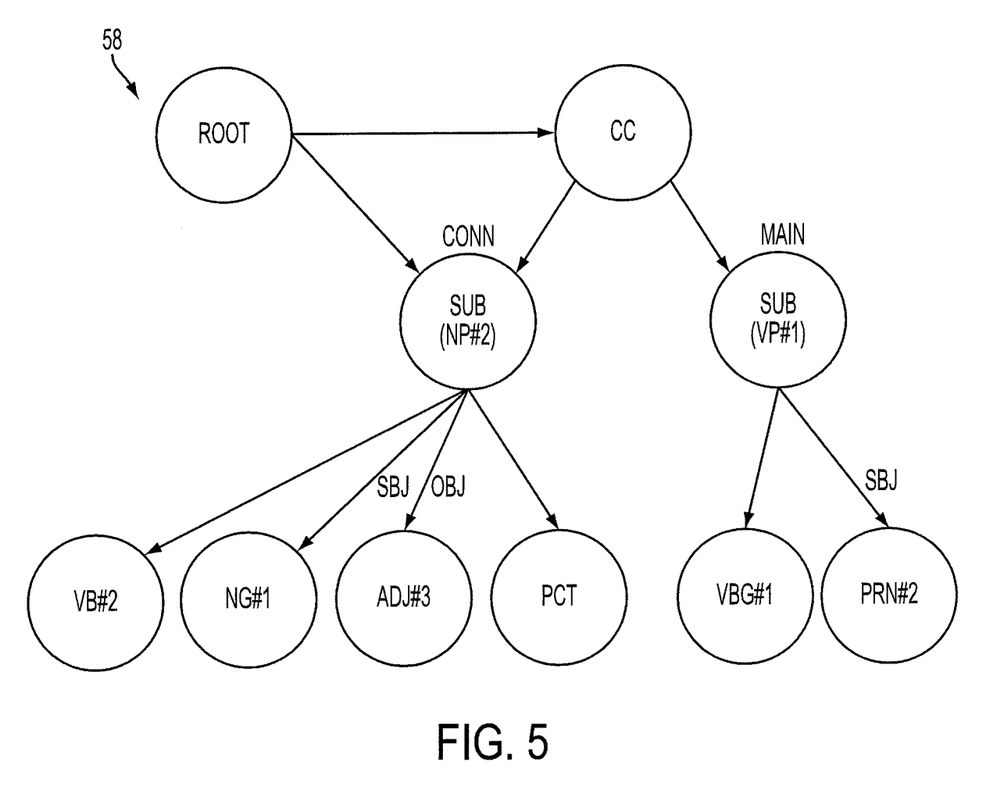
FIG. 5 illustrates a dependency template for generating a natural language response using natural language generation.

Thus, these similar lexical categories and syntactic dependencies between training sentences 1-3 can be merged into one representation or dependency template which is operative to generate all three sentences and variations thereof when responding to a customer inquiry. The only difference between the sentences may be the actual words of the lexical categories. However, replacing the actual words with variables makes up for these differences and also provides a link to the knowledge base, such that many variations and/or paraphrases of the training sentences can be generated. Thus, applying the action grammar as generation grammar to the dependency template, a sentence can be generated which is similar in content to the training sentences, mimics the dialogue which might occur with a live agent, and is grammatically correct. FIG. 5 represents the dependency template 58 which is a representation of all three training sentences which can be retrieved by the NLG component 44 of system 10.

As shown in FIG. 5, the dependency template has a ROOT node, representing the entire sentence to be generated. Reading from left to right, the ROOT is linked to two sub-nodes ("SUB"), the first being the noun phrase ("NP") node, tagged with variable #2 and the second being the verb phrase ("VP") node, tagged with variable #1. A coordination ("CC") can connect the head argument ("MAIN"), or VP#1, to the subordinate or dependent argument NP#2. This dependency is indicated by the independent-dependent dependency ("CONN"). The leaf nodes of the NP#2 node are a verb ("VB"), a nominal word group ("NG"), an adjective word group ("ADJ"), and a punctuation mark ("PCT"). The VB, NG, and ADJ leaf nodes have been tagged with variables #2, #1, and #3, respectively. Significantly, the subject ("SBJ") of the NP#2 node is identified as being the NG#1 leaf, and the object ("OBJ") of the NP#2 node is identified as being the ADJ#3 leaf. The leaf nodes of the VP#1 node include a verbal word group ("VBG"), tagged with variable #1, and a pronoun group ("PRN"), tagged with variable #2. Significantly, the subject ("SBJ") of the VP#1 node is identified as being the PRN#2 leaf.

This dependency template can be used to generate a response to a customer inquiry. The dependency template is a set of syntactic rules which define how the response sentence should be organized and which words should fill in the variables for proper meaning. For example, the NP#2 node in FIG. 5 builds a dependency between a noun group NG#1 and a verb VB#2. These two leaves are sub-nodes of a noun phrase NP#2. The focus of the subject (SBJ) relation is the noun group and the verb, respectively #1 and #2. Variables #1 and #2 link back to the knowledge base with a category or list of words which can fill variables #1 and #2. In this example, the variable #1 in "NG#1" links to a list of words including "Wi-Fi" and "touch screen", which the parser previously tagged as relevant to the particular case in the knowledge base in which the dependency template shown in FIG. 5 is stored.

FIG. 5 also builds a dependency between verb VB#2 and an adjective ADJ#3. These two leaves are also sub-nodes of noun phrase NP#2. The focus of the object (OBJ) relation is the verb VB#2 and the adjective ADJ#3. In this example, the variable #3 links to a list of words, including activated, functional, and turned on. Finally, FIG. 5 shows a dependency between the noun phrase NP#2 and the verb phrase VP#1. First, the MAIN designation shown for verb phrase VP#1 indicates that NP#2 is an independent clause which can generate a grammatically correct sentence alone. However, verb phrase VP#1 can also be linked to dependent or subordinate clause shown as noun phrase NP#2 in FIG. 5. The subordinate noun phrase NP#2 can be used to generate variations on the verb phrase VP#1.

The exemplary dependency template shown in FIG. 5 will be stored in the knowledge base along with its corresponding organized case representing the category of customer problem-agent solution dialogue in which it is stored. When a customer inquiry needs to be answered, the dependency template can be extracted if the comparison component of the dialogue manager determines a match. Based on the match, the system 10 can then extract the associated solution description represented by the dependency template 58 and use it to generate the response to the customer. As discussed above, the dependency template 58 shown in FIG. 5 is a hierarchy of rules mapped by the planner 60 which must be followed in order to generate a natural language response 64. The rules in the dependency template 58 are read and processed by the NLG component 44 in a top-down manner—i.e., starting with the highest level nodes and working down, following the text from left to right. This order determines the way the natural language response 64 is generated. Actual words from a customer-agent dialogue can fill in the variables for each lexical category, via the link to the knowledge base. Variations can be achieved in this example by following only the pattern of the MAIN VP#1 node, or the NP#2 node. Variations can also be achieved by following both the MAIN and CONN nodes, so that the MAIN node, has a dependent clause. Each dependency template 58 is thus configured to generate a single sentence responsive to a customer inquiry which is representative of a number of sentences that a live agent might provide as a solution description in an actual dialogue.

If a problem description match was determined by the comparison component in which the corresponding solution description was associated with the dependency template shown in FIG. 5, the planner would extract the dependency template and generate the sentences in Table 3 below.

TABLE 3

Set of sentences generated with the dependency template

| | Sentences generated | No Error? |
|---|---|---|
| 1. | Can you tell me if the Wi-Fi is activated? | ✓ |
| 2. | Can you tell me if the Wi-Fi is turned on? | ✓ |
| 3. | Can you tell me if the Wi-Fi is functional? | ✓ |
| 4. | Can you check if the Wi-Fi is activated? | ✓ |
| 5. | Can you check if the Wi-Fi is turned on? | ✓ |
| 6. | Can you check if the Wi-Fi is functional? | ✓ |
| 7. | Is the Wi-Fi activated? | ✓ |
| 8. | Is the Wi-Fi turned on? | ✓ |
| 9. | Is the Wi-Fi functional? | ✓ |
| 10. | Can you tell me if the touch screen is activated? | ✓ |
| 11. | Can you tell me if the touch screen is turned on? | ✓ |
| 12. | Can you tell me if the touch screen is functional? | ✓ |
| 13. | Can you check if the touch screen is activated? | ✓ |
| 14. | Can you check if the touch screen is turned on? | ✓ |
| 15. | Can you check if the touch screen is functional? | ✓ |
| 16. | Is the touch screen activated? | ✓ |
| 17. | Is the touch screen turned on? | ✓ |
| 18. | Is the touch screen functional? | ✓ |

Comparing Table 3 with Table 2, it can be seen that the exemplary dependency template approach can generate more sentence variations in response to a customer inquiry, without any grammatical errors. Sentences 7-9 and 16-18 can be generated from the dependency template illustrated in FIG. 5 by following, in a top-down manner, only the pattern and rules of the MAIN or noun phrase node NP#2. The remaining sentences 1-6 and 10-15 can be generated by following, in a top-down manner, the pattern and rules of the CONN or verb phrase node VP#1, and then following the pattern of the MAIN or noun phrase node NP#2. In all of the generated sentences 1-18 in Table 3 above, the variables in the dependency template of FIG. 5 can be filled in with the corresponding terms in the list of actual words, represented by the same variable, by reading the dependency template from left to right.

The dependency template approach of the exemplary NLG system allows the NLU component to build the knowledge base from a natural language corpus of customer problem-agent solution dialogue, which is also directly used by the NLG component to generate the sentences in response to a customer inquiry. Thus, the NLG system features a dedicated NLG and NLU component which share the same knowledge in for form of linguistic structures and representations. The knowledge base, indexed according to the actual words that occur in the problem descriptions and solutions, as well as syntactic units that they contain, embodies a planner which can be used as a preliminary step in natural language generation. The planner contains rich linguistic information that can be extracted and used in the exemplary NLG system through the analysis of short, simple sentences.

This information can be stored in the form of the exemplary dependency templates, which provide specific rules for generating grammatically correct sentences which are responsive to a customer inquiry. The dependency rules, which identify lexical categories and the dependencies between them, can be expanded by the inclusion of variables. The variables link the dependencies to the knowledge base of actual words and their various forms, which in turn can be used for natural language generation. Thus, the customer does not need to be able to identify all the linguistic elements necessary to convey in his or her problem description since the dependency template provides the linguistic elements in the context of the sentence.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for generating a natural language response, comprising:
   parsing sentences in a corpus of natural language dialogues to extract dependencies, each parsed sentence being represented by a dependency graph;
   generating dependency templates from the extracted dependency graphs;
   storing the dependency templates in a knowledge base;
   in response to an inquiry, identifying one of the dependency templates in the knowledge base; and
   generating a natural language response to the inquiry using the identified dependency template, the natural language response being generated based on words extracted from the natural language dialogues that are linked to the identified dependency template,
   wherein at least one of the parsing sentences, generating dependency templates, and generating a natural language response is performed with a processor.

2. The method of claim 1, wherein the parsing of sentences in the natural language dialogue comprises:
   extracting, from the corpus, sentences representative of a problem experienced by a customer and the sentences representative of a solution offered by an agent; and
   generating dependency templates from the sentences representative of a solution offered by an agent.

3. The method of claim 1, wherein the parsing of sentences in the natural language dialogue further comprises replacing words in the natural language dialogue with a variable.

4. The method of claim 3, wherein the words replaced by the variable are representative of a topic in the natural language dialogue.

5. The method of claim 3, further comprising storing the words in the knowledge base as a list of words from which a replacement for the variable is selected in the generating of the natural language response.

6. The method of claim 1, wherein the generating of dependency templates further comprises merging a plurality of the extracted dependency graphs having a similar pattern between their dependencies to form the dependency template.

7. The method of claim 1, wherein the generating of the natural language response comprises applying generation grammar rules to the dependency template to generate the natural language response.

8. A system comprising memory which stores instructions for performing the method of claim 1 and a processor in communication with the memory for executing the instructions.

9. A computer program product comprising a non-transitory medium storing instructions, which when executed on a computer, causes the computer to perform the method of claim 1.

10. A system for generating a natural language text, comprising:
    memory which stores instructions for:
        processing sentences in a natural language dialogue to extract dependencies within the sentences, each of the processed sentences being represented by a dependency graph,
        generating dependency templates from the extracted dependency graphs,
        storing the dependency templates in a knowledge base,
        with a planner, extracting at least one dependency template from the knowledge base in response to an inquiry,
        identifying one of the extracted dependency templates based on the inquiry, and
        generating a sentence in natural language based on the extracted dependency template, and
    a processor in communication with the memory which executes the instructions.

11. A method for answering an inquiry comprising:
    providing access to a knowledge base stored in memory, a set of dependency templates being stored in the knowledge base, the dependency templates having been built from a corpus of natural language dialogues, each of the dialogues corresponding to communications between a respective customer and an agent related to a problem experienced with a device by the customer, each dependency template representing a plurality of sentences extracted from the corpus;
    receiving a natural language inquiry from a customer related to a problem experienced with the device;
    parsing the natural language inquiry to extract a set of dependencies;
    comparing the extracted set of dependencies with the dependency templates stored in the knowledge base;
    based on the comparison, identifying one of the dependency templates; and
    generating a natural language response to the inquiry based on the identified dependency template,
    wherein at least one of the parsing the natural language inquiry comparing the extracted set of dependencies, identifying one of the dependency template, and generating the natural language response is performed with a processor.

12. The method of claim 11, wherein the providing access to the knowledge base further comprises accessing the knowledge base with a cloud-based virtual agent.

13. The method of claim 11, wherein each of a plurality of the dependency templates corresponds to at least one solution description associated with a problem description.

14. The method of claim 11, wherein the comparing of the extracted set of dependencies with the dependency templates further comprises matching the set of dependencies extracted from the natural language inquiry to at least one of the problems experienced with the device stored in the knowledge base.

15. The method of claim 14, wherein the matching comprises keyword matching.

16. The method of claim 11, wherein the identifying of the dependency template comprises:
    applying projection rules to the dependency template for lexicalizing the dependency template with words extracted from the natural language dialogue and converting the dependency template into a grammatically-correct natural language sentence.

17. A natural language generation system comprising:
  memory which stores a set of dependency templates in a knowledge base, the dependency templates having been derived from sets of dependencies extracted from parsed natural language dialogues, each of the dependency templates corresponding to a solution in the natural language dialogue provided in response to a problem with a device,
  a natural language understanding component which parses a natural language inquiry relating to the device,
  a dialogue manager which compares the parsed natural language inquiry with the natural language dialogues to find a matching problem in the natural language dialogues,
  a natural language generation component which identifies one of the dependency templates which is associated with one of the solutions in the natural language dialogue, based on the comparison made by the dialogue manager, and which uses the identified dependency template to generate a natural language response to the natural language inquiry, and
  a processor which implements the natural language understanding component, the dialogue manager, and the natural language generation component.

18. The system of claim 17, further comprising a surface generator component for applying a generation grammar to the dependency template to output the natural language response.

19. The system of claim 17, further comprising a structure realizer component for converting the dependency template into a final organized text.

20. The system of claim 17, wherein words of the parsed natural language dialogues from which the knowledge base is derived are used by the natural language generation component to generate the natural language response.

* * * * *